US010807071B2

(12) United States Patent
Suib et al.

(10) Patent No.: US 10,807,071 B2
(45) Date of Patent: Oct. 20, 2020

(54) MESOPOROUS METAL DOPED CERIUM OXIDE CATALYST

(71) Applicant: University of Connecticut, Farmington, CT (US)

(72) Inventors: Steven Suib, Storrs Mansfield, CT (US); Curtis Guild, Storrs Mansfield, CT (US); David Kriz, Willimantic, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 15/498,657

(22) Filed: Apr. 27, 2017

(65) Prior Publication Data

US 2017/0320042 A1    Nov. 9, 2017

Related U.S. Application Data

(60) Provisional application No. 62/332,233, filed on May 5, 2016.

(51) Int. Cl.
| | |
|---|---|
| *B01J 23/10* | (2006.01) |
| *B01J 35/00* | (2006.01) |
| *B01J 23/83* | (2006.01) |
| *B01J 35/10* | (2006.01) |
| *C01B 3/16* | (2006.01) |

(52) U.S. Cl.
CPC ............ *B01J 23/10* (2013.01); *B01J 23/83* (2013.01); *B01J 35/002* (2013.01); *B01J 35/006* (2013.01); *B01J 35/0013* (2013.01); *B01J 35/1019* (2013.01); *B01J 35/1038* (2013.01); *B01J 35/1057* (2013.01); *C01B 3/16* (2013.01); *C01B 2203/1058* (2013.01); *C01B 2203/1076* (2013.01)

(58) Field of Classification Search
None
See application file for complete search history.

(56) References Cited

U.S. PATENT DOCUMENTS

| | | | | |
|---|---|---|---|---|
| 3,883,445 A | * | 5/1975 | Roth | B01D 53/944 502/303 |
| 4,297,246 A | * | 10/1981 | Cairns | B01D 53/86 148/28 |
| 6,503,476 B1 | | 1/2003 | Suib et al. | |
| 7,238,333 B2 | | 7/2007 | Faur-Ghenciu et al. | |
| 7,438,887 B2 | | 10/2008 | Suib et al. | |
| 8,119,558 B2 | | 2/2012 | Wagner et al. | |
| 8,932,981 B2 | | 1/2015 | Landau et al. | |
| 9,452,933 B2 | | 9/2016 | Suib et al. | |
| 9,908,103 B2 | | 3/2018 | Suib et al. | |
| 10,046,313 B2 | | 8/2018 | Suib et al. | |
| 10,138,197 B2 | | 11/2018 | Nandi et al. | |
| 2003/0133990 A1 | | 7/2003 | Hursey et al. | |
| 2006/0052241 A1 | | 3/2006 | Airiau et al. | |
| 2007/0179053 A1 | | 8/2007 | Lee et al. | |
| 2008/0120970 A1 | * | 5/2008 | Hilgendorff | B01D 53/9422 60/299 |
| 2012/0201732 A1 | * | 8/2012 | Augustine | B01D 53/9418 423/239.1 |
| 2014/0255284 A1 | * | 9/2014 | Alden | B01J 23/8892 423/245.3 |
| 2014/0296062 A1 | * | 10/2014 | Suib | C01G 1/02 502/300 |
| 2015/0352530 A1 | * | 12/2015 | Nagao | B01J 23/72 502/304 |
| 2016/0121303 A1 | | 5/2016 | Siub et al. | |
| 2017/0320042 A1 | | 11/2017 | Suib et al. | |
| 2017/0349447 A1 | | 12/2017 | Suib | |

FOREIGN PATENT DOCUMENTS

| | | | |
|---|---|---|---|
| CN | 103055875 | * | 11/2012 |
| DE | 102012011764 | * | 12/2012 |
| JP | 2008232662 | | 10/2008 |
| SU | 212994 | * | 11/1966 |

OTHER PUBLICATIONS

AzoM Powder Matallurgy. (Year: 2002).*
Tsunekawa, et al. "Lattice Relaxaction of monosize CeO2-x . . . ". Applied Surface Science. 152. 53-56 (1999). (Year: 1999).*
Xiaoyuan. "studies of pore structure . . . ". Applied Surface Science. 173. 208-220. (2001). (Year: 2001).*
Li, et al. "Characteriazation and Sintering of Nanocrystalline CeO2 . . . ". Acta Mater. 49. 419-426 (2001). (Year: 2001).*
Zhou "Room Temperature homogeneous . . . ". Appl Phys. Lett. 80. 3814 (2002). (Year: 2002).*
Galindo-Hernandez, Felix, et al. "Hydrolysis catalyst effect on the textural and structural properties of sol-gel mixed oxides TiO2—CeO2". Journal of Ceramic Processing Research. vol. 9. No. 6, 616-623 (2008). (Year: 2008).*
Poyraz, et al., A General Approach to Crystalline and Monomodal Pore Size Mesoporous Materials, Nature Communications, 4:2952; pp. 1-10; 2013.
U.S. Appl. No. 62/332,233, filed May 5, 2016.

* cited by examiner

*Primary Examiner* — Sheng H Davis
(74) *Attorney, Agent, or Firm* — McCarter & English, LLP (57) ABSTRACT

A mesoporous metal doped cerium oxide catalyst is provided. The catalyst can contain nanotextured cerium oxide ($CeO_2$) which can be utilized for hydrogen production or reformate gas purification in a water gas shift reaction. The catalyst may be advantageously used to remove CO from a gas containing CO. The catalyst may also be incorporated into a fuel processor.

16 Claims, 6 Drawing Sheets

MESOPOROUS METAL DOPED CERIUM OXIDE CATALYST

CROSS-REFERENCE TO RELATED APPLICATION

The present application claims priority benefit to a provisional patent application entitled "Mesoporous Metal Doped Cerium Oxide Catalyst," which was filed on May 5, 2016 and assigned Ser. No. 62/332,233. The entire content of the foregoing provisional application is incorporated herein by reference.

STATEMENT OF GOVERNMENT INTEREST

This invention was made with government support under Grant # DE-FG02-86ER13622.A000 awarded by the U.S. Department of Energy. The government has certain rights in this invention.

TECHNICAL FIELD

The present invention generally relates to mesoporous metal doped cerium oxide catalyst. The catalyst contains cerium oxide ($CeO_2$) and at least a second metal which can be utilized for hydrogen production or reformate gas purification in a water-gas shift reaction.

BACKGROUND

The water-gas shift reaction is a reaction of carbon monoxide and water vapor to form carbon dioxide and hydrogen. The mixture of carbon monoxide and hydrogen is known as water gas. The reaction ($CO+H_2O=CO_2+H_2$) is used in industrial hydrogen production as well as an integral component of fuel processing for fuel cell applications. Commercial application of the water-gas shift reaction is performed using a catalyst.

Many different catalysts have been used with the water-gas shift reaction. Most current catalysts compose metals supported on oxide supports. These catalysts often have a second component to prevent aggregation of the metals. Examples of current catalyst include gold supported on zinc oxide with alumina ($Au/ZnO/Al_2O_3$), platinum on cerium oxide ($Pt/CeO_2$), and copper supported on either of these supports ($Cu/ZnO$ & $Cu/CeO_2$).

The present disclosure relates to a novel mesoporous metal doped cerium oxide catalyst capable of use with the water-gas shift reaction.

SUMMARY

In one embodiment, the present disclosure relates to a mesoporous metal doped cerium oxide catalyst containing cerium oxide and at least one additional metal. The additional metal can be non-uniformly distributed within the catalyst.

In another embodiment, the present disclosure relates to a method of removing CO from a gas containing CO, including contacting the catalyst of the present disclosure with the gas containing CO. In another embodiment, the present disclosure relates to a fuel processor containing a catalyst of the present disclosure.

The present disclosure provides a number of advantages over current catalysts including increasing the rate of the water-gas shift reaction, the yield of the water-gas shift reaction, and the efficiency of the water-gas shift reaction.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems and methods of optimizing operation efficiency of a motor drive, reference is made to the accompanying figures, wherein.

DETAILED DESCRIPTION

The present disclosure relates to a mesoporous metal doped cerium oxide catalyst containing cerium oxide and at least one additional metal. The catalyst can include cerium oxide and a second metal.

The second metal, or at least one additional metal, can be any metal whose presence increases the rate of the water-gas shift reaction, increases the yield of the water-gas shift reaction, increases the efficiency of the water-gas shift reaction, or combinations thereof. The metal can be one that is commercially available and inexpensive. For example, the metal can include Cu, Ni, Ti, Mg, Fe, Co or Zn, including oxides and combinations thereof. The metal can include Cu or Ni including oxides and combinations thereof. The metal can include Cu or Cu oxide.

The composition of the catalyst can vary depending, in part, on the desired conditions of the reaction. The catalyst can contain about 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99 wt % cerium or cerium oxide. These values can be used to define a range, such as about 70 to about 99 wt %, or about 88 to about 99 wt %, or about 90 to about 95 wt %.

The catalyst can contain about 1, 2, 3, 4, 5, 6, 7, 8, 9, 10, 11, 12, 13, 14, 15, 16, 17, 18, 19, 20, 21, 22, 23, 24, 25, 26, 27, 28, 29 or about 30 wt % of the second metal, or the at least one additional metal (e.g., two or more metals). These values can be used to define a range, such as about 1 to about 30 wt %, or about 1 to about 12 wt %, or about 5 to about 10 wt %.

The second metal, or at least one additional metal, can be uniformly distributed within the catalyst. Alternatively, the second metal, or at least one additional metal, can be non-uniformly distributed within the catalyst. As described herein, during the catalyst preparation the second metal, or at least one additional metal, can be added before, during or after the initial formation of the mesoporous cerium oxide portion of the catalyst. In some embodiments, the second metal, or at least one additional metal, can be predominately distributed near the catalyst surface. For example, about 5, 10, 15, 20, 25, 30, 35, 40, 45, 50, 55, 60, 65, 70, 75, 80, 85, 90 or about 95 wt % of the second metal, or at least one additional metal, is located within about 0.1, 0.5, 1, 5, 10, 50 or 100 A from the catalyst surface. Both the wt % values and the distance values can be used to define independent ranges, such as about 50 to about 90 wt % of the second metal, or at least one additional metal, is located within about 0.1 to about 10 A from the catalyst surface.

The advantages of the catalyst of the present disclosure can be attributed, in part, to its three-dimensional structure. The catalyst can be composed of nanoparticles densely aggregated into a three-dimensional structure in such a way that the void spaces between the particles expand in size when undergoing heat treatment. In some embodiments, the particles can coalesce into uniform structures upon heat treatment in which they exhibit strong activity and stability in the reaction. The small nanoparticle size of the catalyst also helps it resist traditional poisoning mechanisms.

For example, the catalyst can include a plurality of aggregated particles wherein individual particles have various particle sizes. The average particle size can be about 0.5, 1, 2, 3, 4, 5, 6, 7, 8, 9 or about 10 nm. These values can be used to define a range, such as about 1 to about 5 nm. The plurality of aggregated particles can have an average distance between particles of about 1, 2, 3, 4, 5, 6, 7, 8, 9, 10, 11, 12, 13, 14, 15, 16, 17, 18, 19 or about 20 nm. These values can be used to define a range, such as about 3 to about 10 nm. The average distance can be measured by standard techniques and conventions known by persons of skill in the art. For example, the average distance can be measured from particle center to particle center, or from outer surface/edge to outer surface/edge.

The catalyst can include crystallites, grains or both of various sizes. Crystallite size and grain size relate to a single crystal. A crystallite can be a single crystal in powder form. A grain can be a single crystal within a bulk or thin film material. A particle can be an agglomerate of these. A particle can consist of 2 or more individual crystallites. A particle can be small enough in size to not be a bulk or thin film. In some embodiments, the catalyst can have an average crystalline size of about 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4 or about 6.5 nm. These values can be used to define a range, such as about 4.8 to about 5.6 nm.

The catalyst can also have an average lattice constant of about 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4 or about 6.5 A. These values can be used to define a range, such as about 5.2 and about 5.6 A.

The structure of the catalyst can result in a higher occurrence of active sites on the catalyst surface. The catalyst can have an average surface area of about 30, 40, 50, 60, 70, 80, 90, 100, 110, 120, 130, 140, 150, 160, 170, 180, 190, 200, 210, 220, 230, 240, 250, 260, 270, 280, 290 and about 300 $m^2/g$. These values can be used to define a range, such as about 50 to about 250 $m^2/g$.

The three-dimensional structure can also have a favorable porosity for gas permeation. The catalyst can also have an average pore volume of about 0.03, 0.04, 0.05, 0.06, 0.07, 0.08, 0.09, 0.1, 0.2, 0.3, 0.4 and about 0.5 cc/g. These values can be used to define a range, such as about 0.05 to about 0.3 cc/g.

The catalyst can also have an average pore diameter of about 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95 and about 2.00 nm. These values can be used to define a range, such as about 1.40 to about 1.45 nm.

The catalyst can be sintered or un-sintered. The catalyst can be used in a reaction, e.g., the water-gas shift reaction, below, at or above its sintering temperature. In some embodiments the catalyst performs better in an un-sintered form. The catalyst can have a sintering temperature of about, or greater than about 280, 290, 300, 310, 320, 330, 340, 350, 360, 370, 380, 390, 400, 410, 420, 430, 440 or about 450° C. These values can be used to define a range, such as about 380 to about 420° C.

In another embodiment, the present disclosure relates to a method of producing a metal doped cerium oxide catalyst including a second metal precursor added to the initial precursor solution, or added via adsorption of a solution containing the desired metal salt to the previously synthesized metal oxide. For example, the catalyst can be synthesized via a sol-gel route utilizing Pluronic® P-123 as a surfactant. The use of a surfactant can create nano-reactors containing metallic oxo-clusters. Nitric acid can be utilized in the process to control the pH of the system. The pH can be controlled via the solvothermal decomposition of nitric acid and the nitrate counter ions. The controlled decomposition of nitrous oxides and nitrate anions has been shown to control the condensation of the oxide products out of the nano-reactor to form homogeneous nanoparticles of a small size distribution.

The solid isolated from the sol-gel reaction can then treated by a calcination treatment. The calcination treatment can include multiple cycles of heating and cooling. The cycles can include 2, 3, 4, 5, 6, 7, 8, 9, or 10 different cycles. The temperature of each cycle can be about 100, 150, 200, 250, 300, 350, 400, 450, 500, 550, 600, 650, 700, 750, 800, 850, 900, 950 or 1000° C. These values can be used to define a range, such as about 150 to about 650° C. Each heating cycle can last 0.5, 1, 2, 3, 4, 5, 6, 7, 8, 9, 10, 12, 14, 16, 18, 20, 22, 24, 28, 32 or about 36 hours. In one embodiment, the calcination treatment consists of six to twenty-four hours at 150° C., following by cooling and re-calcination to higher temperatures ranging from 150° C. to 650° C. A ripening period ranging from 1 hour to six hours at the final calcination temperature may be allotted prior to cooling to room temperature. Alternatively, the solid powder may be calcined directly omitting the aforementioned initial calcination at 150° C., and may be instead calcined from room temperature directly to a temperature up to 650° C. at a controlled ramp rate from 0.1° C./min to 20° C./min. A ripening period ranging from 1 hour to six hours at the final calcination temperature may be allotted prior to cooling to room temperature.

The catalyst of the present disclosure can increase the rate of the water-gas shift reaction (e.g., rate improvement) compared to other commercially available catalysts, including other mesoporous cerium oxide catalysts. The catalyst can increase the reaction rate by about 10, 20, 30, 40, 50, 60, 70, 80, 90 or about 100% compared to other catalysts. These values can be used to define a range of improvement, such as about 20 to about 50%.

The catalyst of the present disclosure can also increase the yield of the water-gas shift reaction relative to hydrogen, carbon dioxide or both as compared to other commercially available catalysts, including other mesoporous cerium oxide catalysts. The catalyst can increase the yield rate by about 10, 20, 30, 40, 50, 60, 70, 80, 90 or about 100% compared to other catalysts. These values can be used to define a range, such as about 20 to about 50%.

Further, the catalyst of the present disclosure can increase the efficiency of the water-gas shift reaction relative to water, carbon monooxide or both as compared to other commercially available catalysts, including other mesoporous cerium oxide catalysts. The catalyst can increase the efficiency by about 10, 20, 30, 40, 50, 60, 70, 80, 90 or about 100% compared to other catalysts. These values can be used to define a range, such as about 20 to about 50%.

The catalyst of the present disclosure is stable under reaction conditions, such as when utilized with the water gas shift reaction. The catalyst can perform the reaction without any immediate deactivation. In some embodiments, the catalyst of the present disclosure demonstrates improved stability in the water-gas shift reaction as compared to other commercially available catalysts, including other mesoporous cerium oxide catalysts. The stability of the catalyst is about 10, 20, 30, 40, 50, 60, 70, 80, 90 or about 100% better than other catalysts. These values can be used to define a range, such as about 20 to about 50%.

In another embodiment, the present disclosure relates to a method of removing CO from a gas containing CO, comprising contacting the catalyst of the present invention with the gas containing CO. For example, the catalyst can be employed in a process in which carbon monoxide and steam are converted to hydrogen and carbon dioxide at various temperature and at various pressures.

The catalyst can be present in the gas, or feed stream, in about 1, 2, 3, 4, 5, 6, 7, 8, 9, 10, 11, 12, 13, 14 or about 15% (by mol) of the gas stream. These values can be used to define a range, such as about 2 to about 5%. The catalyst can provide adequate CO conversion in comparison to the performance of conventional water gas shift catalysts as well as significant reduction in methanation and other hydrocarbon by-products.

The contacting or converting can be performed at various temperatures including about, less than about, or greater than about 100, 110, 120, 130, 140, 150, 160, 170, 180, 190, 200, 210, 220, 230, 240, 250, 260, 270, 280, 290, 300, 310, 320, 330, 340 or about 350° C. These values can be used to define a range, such as about 150 to about 300° C.

The contacting or converting can be performed at various pressures including about, less than about, or greater than about 1, 5, 10, 15, 20, 25 or about 30 bar. These values can be used to define a range, such as about 1 to about 10 bar.

The catalyst of the present disclosure is effective and demonstrates the ability to perform the reaction without the aid of a promoter, such as a metallic promotor, a transition metal active component, support, a compound that prevents aggregation, or combinations thereof. For example, the reaction occurs without a discreet metal such as gold, platinum, or copper. The present disclosure demonstrates the activity of a metal-doped catalyst wherein the doped metal is ionic in nature and is reduced in-situ to a metal.

The catalyst of the present disclosure can be used in various fields, including fuel processors and other gas treatment systems.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

EXAMPLES

Example 1. Mesoporous Copper Doped Cerium Oxide Catalysts were Prepared Having Various Levels of Copper Incorporated Therein Cerium (III) nitrate hexahydrate (0.02 mol) and copper (II) nitrate hexahydrate (0-0.002 mol) was dissolved in a solution containing 0.188 mol (14 g) of 1 butanol, 0.032 mol (2 g) of $HNO_3$, and $5.1 \times 10^4$ mol (3 g) of P123 surfactant in a 150-mL beaker at RT and under magnetic stirring. The obtained clear gel was placed in an oven at 120° C. for 5 h. The obtained powder was washed several times with ethanol and then the powder was centrifuged. Finally, the powder was dried in a vacuum oven overnight. The dried powders were subjected to heating cycles to achieve desired crystal structure and mesopore size. The solid isolated from the sol-gel reaction is then treated by a calcination treatment consisting of between 6-24 hours at 150° C., following by cooling and re-calcination to higher temperatures ranging from 150° C. to 650° C. All heat treatments were done under air.

Figure 1:
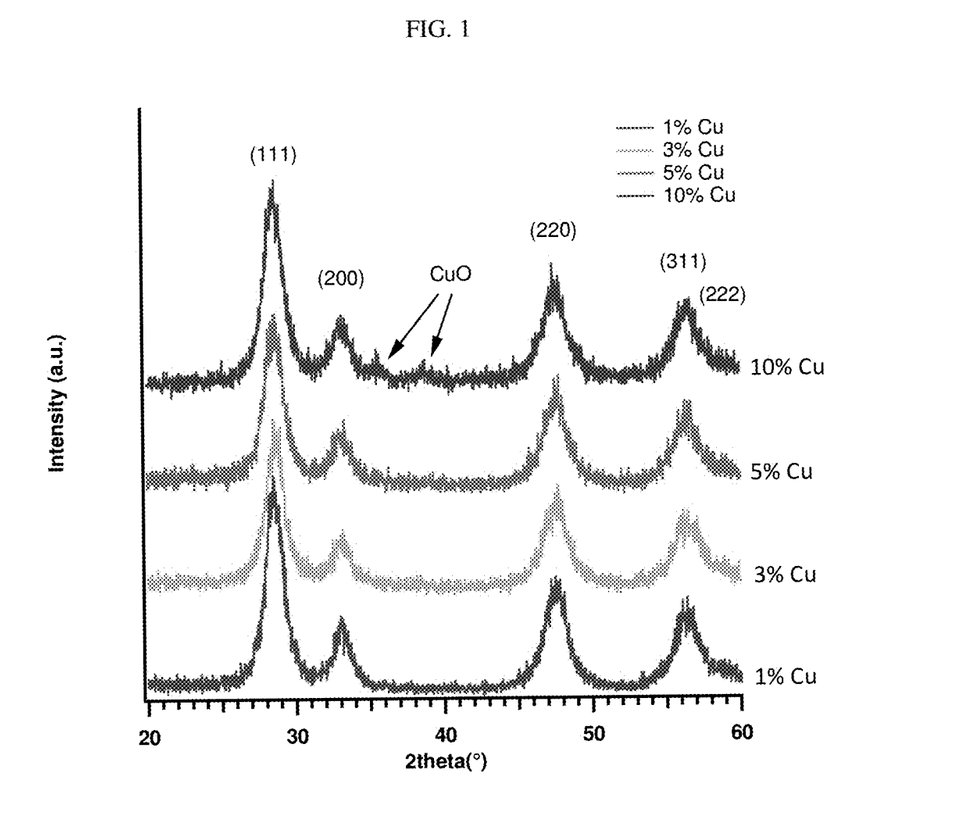
FIG. 1 shows the powder x-ray diffractions of the catalysts in Example 1 having various quantities of copper incorporated therein.

Four different mesoporous copper doped cerium oxide catalysts were prepared having 1%, 3%, 5% and 10% copper (mol % values), as well as a control sample with 0% copper. The catalysts were examined by powder x-ray diffraction using a Rigaku Ultima IV powder diffractometer. FIG. 1 shows the powder x-ray diffractions of the catalysts in which various quantities of copper are incorporated during the synthesis. At 10% copper loading by mol, there is an observed phase separation in which CuO is observed by X-ray diffraction. The phase separation indicates a limit of copper solubility in ceria by this preparation method.

TABLE 1

| Sample | Lattice Constant (Å) | Crystallite Size (nm) |
|---|---|---|
| 1% Cu | 5.42 | 5.31 |
| 3% Cu | 5.39 | 5.46 |
| 5% Cu | 5.41 | 5.41 |
| 10% Cu | 5.39 | 5.03 |

Figure 2:
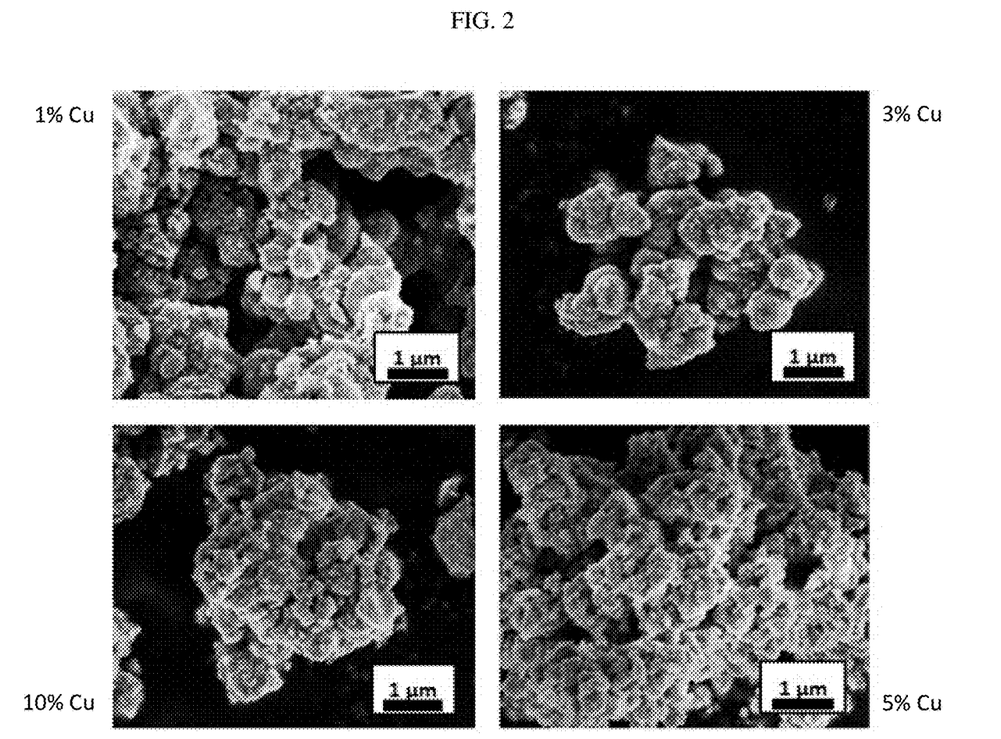
FIG. 2 shows electron microscopy images of the catalysts in Example 1.
Figure 3:
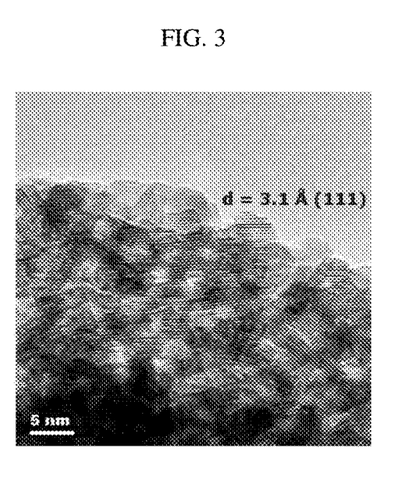
FIG. 3 shows a transmission electron microscopy image of the 5% Cu sample in Example 1.

The catalysts were also examined by electron microscopy using an FEI NovaSEM Scanning Electron Microscope. Samples were pressed into carbon tape on stainless steel sample stubs. FIG. 2 shows electron microscopy images of the copper-doped ceria nanoparticle aggregates. FIG. 3 shows the transmission electron microscopy image of the 5% Cu sample. Regular spacing (e.g., porosity) of the material is observed. The crystallites are observed to be about 5 nm in diameter, which is in agreement with the x-ray diffraction data. The lattice fringes of the particles are delineated in the image and are observed to be separated by a distance of about 3.1 angstroms. This correlates to the (111) of the catalyst, or $CeO_2$, lattice.

Figure 4:
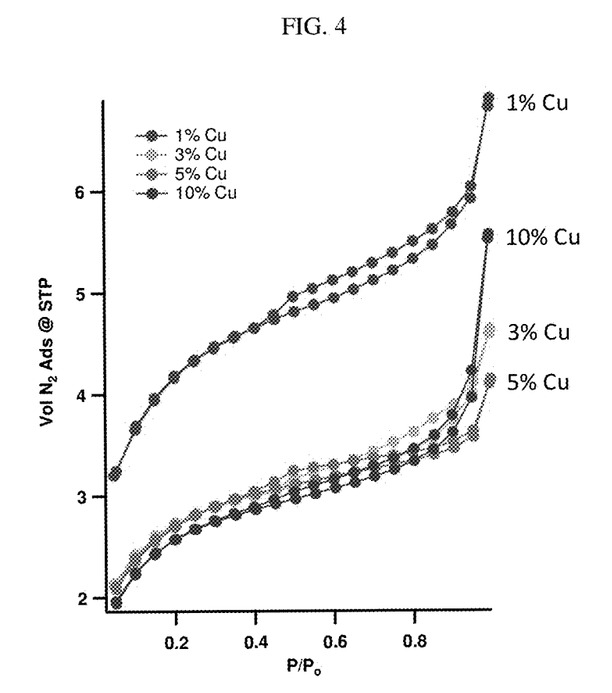
FIG. 4 shows BET (Brunauer-Emmett-Teller) porosity data showing evidence of mesoporosity and microporosity via the sharp uptake during $N_2$ adsorption.

Table 2 lists additional textural properties of the copper-doped ceria. The surface area is observed to increase with copper doping from 117 to 203 $m^2/g$. The pore volume is also observed to increase in volume with increased copper doping. The pore diameter is observed to remain relatively constant. FIG. 4 shows $N_2$ adsorption-desorption isotherms from which the data in Table 2 was derived.

TABLE 2

| Sample | Surface Area (m²/g) | Pore Volume (cc/g) | Pore Diameter (nm) |
|---|---|---|---|
| Cu-Ceria Bulk | 2 | 0.019 | 2.99 |
| 1% Cu | 117 | 0.089 | 1.43 |
| 3% Cu | 127 | 0.101 | 1.416 |
| 5% Cu | 181 | 0.123 | 1.42 |
| 10% Cu | 203 | 0.200 | 1.42 |

The nonporous copper-impregnated ceria exhibited a low surface area (2 m²/g) and exhibited a primarily cubic morphology, as compared to the nanocrystalline catalysts.

The catalysts were also examined by atomic absorption spectroscopy (AAS) using a Perkin Elmer Atomic Absorption Spectrometer. The weight percentages of copper contained in the samples was calculated and is provided in Table 3.

TABLE 3

| Sample | Wt % Cu in CeO₂ |
|---|---|
| 1% Cu | 1.265 |
| 3% Cu | 4.301 |
| 5% Cu | 7.005 |
| 10% Cu | 20.746 |

The catalysts were then tested in a water-gas shift reaction. The catalysts were compared against a nonporous copper-impregnated commercial ceria (Acros Organics). In a horizontal tube furnace, 50 mg of catalyst was suspended with quartz wool in a quartz reactor. 5 vol % CO in helium gas was flown through a water bubbler at 25° C. to make a vapor component of ~3 vol %. This humidified feed gas was flown at 50 sscm through the catalyst bed where it was reacted. The effluent gas was analyzed via a calibrated on-line gas chromatograph (SRI 8610C Multi-gas #3) where the gases were separated and quantified.

Figure 5:
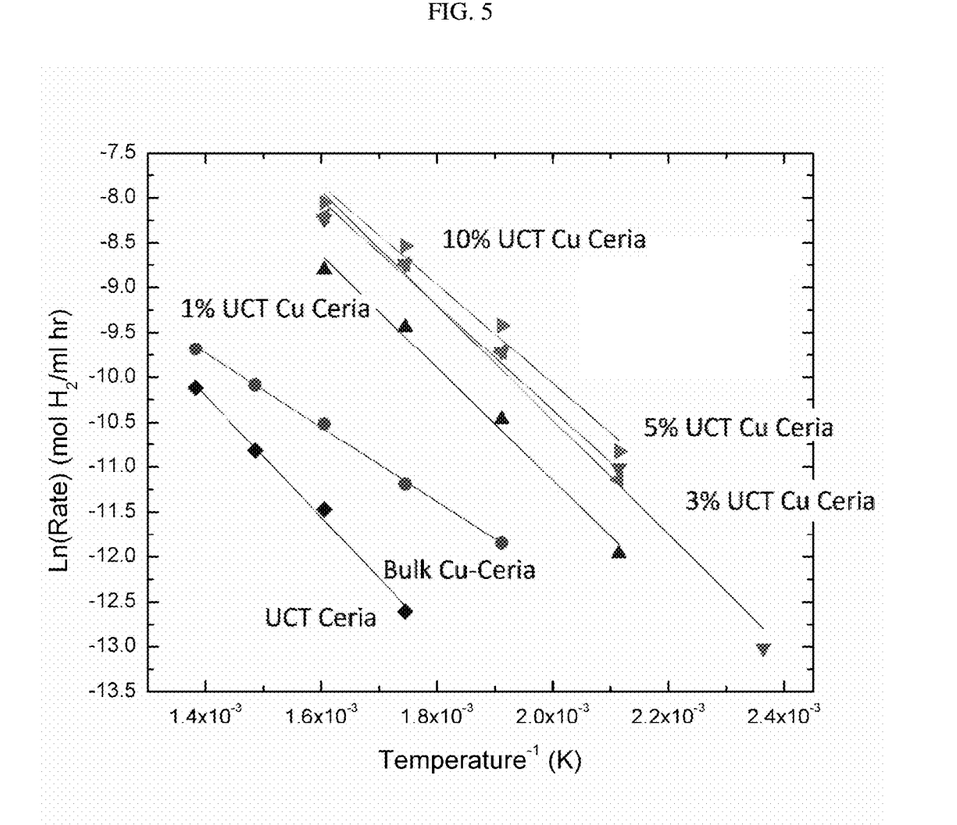
FIG. 5 shows the carbon dioxide conversion of the catalysts in Example 1 at a gas hourly space velocity of 63,000 $s^{-1}$ in a feed gas stream of 5% CO/3% $H_2O$/He.

FIG. 5 shows the carbon dioxide conversion of the copper ceria catalysts at a gas hourly space velocity of 63,000 s⁻¹ in a feed gas stream of 5% CO/3% $H_2O$/He. The fine copper crystallites sinter at high temperatures resulting in the observed deactivation at 450° C.

Figure 6:
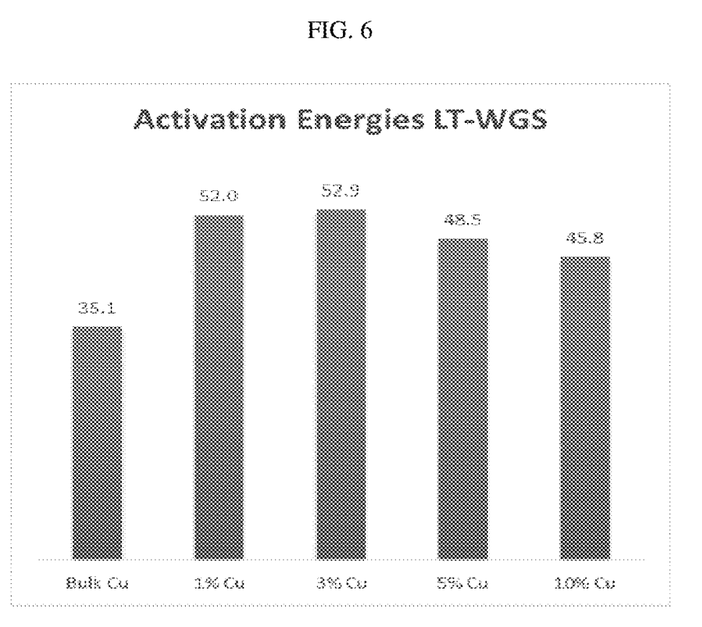
FIG. 6 shows the observed activation energies for the catalysts in Example 1 for the water-gas shift reaction.

FIG. 6 shows the observed activation energies for the water-gas shift and related Arrhenius plots. The 10% copper demonstrates the lowest activation energy for the reaction. While the commercial ceria demonstrates a lower activation energy, it delivers insufficient performance (e.g., conversion) compared to the catalysts of the present disclosure due in part to its low surface area.

Related Publications are provided below, the contents of each are incorporated by reference in their entirety.

Arumugam, Ayyakannu; Karthikeyan, Chandrasekaran; Haja Hameed, Abdulrahman Syedahamed; Gopinath, Kasi; Synthesis of cerium oxide nanoparticles using *Gloriosa superba* L. leaf extract and their structural, optical and antibacterial properties Materials Science & Engineering, C: Materials for Biological Applications (2015), 49, 408-415.

Jayanthi, S. S. A novel eco friendly synthesis of cerium oxide nano particles using glycerol as stabilizing agent Nano Science and Nano Technology: An Indian Journal (2014), 8(7), 274-278.

Thakur, Sharada; Patil, Pradip Rapid synthesis of cerium oxide nanoparticles with superior humidity-sensing performance Sensors and Actuators, B: Chemical (2014), 194, 260-268.

Singh, Virendra; Singh, Sanjay; Das, Soumen; Kumar, Amit; Self, William T.; Seal, Sudipta A facile synthesis of PLGA encapsulated cerium oxide nanoparticles: release kinetics and biological activity, Nanoscale (2012), 4(8), 2597-2605.

Goharshadi, Elaheh K.; Samiee, Sara; Nancarrow, Paul Fabrication of cerium oxide nanoparticles: Characterization and optical properties Journal of Colloid and Interface Science (2011), 356(2), 473-480.

Poyraz Altug S; Kuo Chung-Hao; Biswas Sourav; King'ondu Cecil K; Suib Steven L A general approach to crystalline and monomodal pore size mesoporous materials Nature communications (2013), 42952

We claim:
1. A catalyst comprising:
   (i) cerium oxide, and
   (ii) a second metal,
   wherein the cerium oxide and the second metal are combined such that the cerium oxide is doped with the second metal to define a mesoporous metal doped cerium oxide catalyst, the second metal formed in-situ so as to be uniformly or non-uniformly distributed within the mesoporous metal doped cerium oxide catalyst;
   wherein an average pore volume for the mesoporous metal doped cerium oxide catalyst is between about 0.05 and about 0.5 cc/g;
   wherein an average pore diameter for the mesoporous metal doped cerium oxide catalyst is between about 1.40 and about 1.45 nm;
   wherein the mesoporous metal doped cerium oxide catalyst defines a surface and the second metal is located within about 0.1 to about 10 A from the surface of the mesoporous metal doped cerium oxide catalyst; and
   wherein the mesoporous metal doped cerium oxide catalyst comprises a plurality of aggregated particles having a particle size between 1 and 5 nm.

2. The catalyst of claim 1, wherein the second metal is Cu, Ni, Ti, Mg, Fe, Co or Zn.

3. A catalyst comprising:
   (i) cerium oxide, and
   (ii) a second metal,
   wherein the cerium oxide and the second metal are combined such that the cerium oxide is doped with the second metal to define a mesoporous metal doped cerium oxide catalyst, the second metal formed in-situ so as to be uniformly or non-uniformly distributed within the mesoporous metal doped cerium oxide catalyst;
   wherein an average pore volume for the mesoporous metal doped cerium oxide catalyst is between about 0.05 and about 0.5 cc/g;
   wherein an average pore diameter for the mesoporous metal doped cerium oxide catalyst is between about 1.40 and about 1.45 nm;
   wherein the mesoporous metal doped cerium oxide catalyst defines a surface and the second metal is located within about 0.1 to about 10 A from the surface of the mesoporous metal doped cerium oxide catalyst;
   wherein the second metal is Cu or Ni.

4. A catalyst comprising:
   (i) cerium oxide, and
   (ii) a second metal, wherein the cerium oxide and the second metal are combined such that the cerium oxide is doped with the second metal to define a mesoporous metal doped cerium oxide catalyst, the second metal formed in-situ so as to be uniformly or non-uniformly distributed within the mesoporous metal doped cerium oxide catalyst;

wherein an average pore volume for the mesoporous metal doped cerium oxide catalyst is between about 0.05 and about 0.5 cc/g;

wherein an average pore diameter for the mesoporous metal doped cerium oxide catalyst is between about 1.40 and about 1.45 nm;

wherein the mesoporous metal doped cerium oxide catalyst defines a surface and the second metal is located within about 0.1 to about 10 A from the surface of the mesoporous metal doped cerium oxide catalyst;

wherein the second metal is Cu.

5. The catalyst of claim 1, comprising between about 70 and about 99 wt % cerium oxide and between about 1 and about 30 wt % second metal.

6. The catalyst of claim 1, wherein the mesoporous metal doped cerium oxide catalyst comprises a plurality of aggregated particles wherein the average distance between particles is between about 1 and about 10 nm.

7. The catalyst of claim 1, wherein an average lattice constant for the mesoporous metal doped cerium oxide catalyst is between about 5.2 and about 5.6 A.

8. The catalyst of claim 1, wherein an average crystalline size for the mesoporous metal doped cerium oxide catalyst is between about 4.8 and about 5.6 nm.

9. The catalyst of claim 1, wherein an average surface area for the mesoporous metal doped cerium oxide catalyst is between about 50 and about 300 $m^2/g$.

10. The catalyst of claim 1, wherein an average pore volume for the mesoporous metal doped cerium oxide catalyst is between about 0.3 and about 0.5 cc/g.

11. The catalyst of claim 1, wherein a sintering temperature of the mesoporous metal doped cerium oxide catalyst is greater than about 400° C.

12. A method of removing CO from a gas containing CO, comprising contacting the catalyst of claim 1 with the gas containing CO.

13. The method of claim 12, wherein the contacting is performed at a temperature between about 150° C. and about 300° C.

14. A fuel processor containing the catalyst of claim 1.

15. The catalyst of claim 1, wherein the second metal is not uniformly distributed within the catalyst.

16. The catalyst of claim 1, wherein the second metal is Cu or Ni.

* * * * *